(12) United States Patent
Campbell et al.

(10) Patent No.: US 7,994,103 B2
(45) Date of Patent: *Aug. 9, 2011

(54) METHOD FOR CONTROLLED PLACEMENT OF CHEMICALS AND COMPOSITION USEFUL FOR PRACTICING SAME

(75) Inventors: Samuel Everett Campbell, Richmond, TX (US); Kenneth J. Tacchi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 912 days.

This patent is subject to a terminal disclaimer.

(21) Appl. No.: 11/558,592

(22) Filed: Nov. 10, 2006

(65) Prior Publication Data

US 2007/0254816 A1 Nov. 1, 2007

Related U.S. Application Data

(63) Continuation-in-part of application No. 10/642,901, filed on Aug. 18, 2003, now Pat. No. 7,135,440.

(51) Int. Cl.
*C09K 8/524* (2006.01)
*C09K 8/536* (2006.01)

(52) U.S. Cl. .......... 507/269; 507/90; 507/263; 507/264; 507/265; 507/270; 507/271; 507/276; 507/277

(58) Field of Classification Search .................... None
See application file for complete search history.

(56) References Cited

U.S. PATENT DOCUMENTS

| | | | |
|---|---|---|---|
| 2,836,555 A | 5/1958 | Armentrout | 507/112 |
| 3,577,515 A * | 5/1971 | Vandegaer | 424/497 |
| 3,676,366 A | 7/1972 | Podschus et al. | 264/4.1 |
| 3,759,949 A | 9/1973 | Fancher et al. | 252/8.55 B |
| 4,192,753 A | 3/1980 | Pye et al. | 252/8.5 A |
| 4,588,640 A | 5/1986 | Matlach | 428/407 |
| 4,659,334 A | 4/1987 | Matlach | 44/51 |

(Continued)

FOREIGN PATENT DOCUMENTS

WO WO93/22537 11/1993

(Continued)

OTHER PUBLICATIONS

Schlumberger Oilfied Dictionary; definition of "upstream"; ( http://www.glossary.oilfield.slb.com/Display.cfm?Term=upstream); 2002.*

*Primary Examiner* — John J Figueroa
(74) *Attorney, Agent, or Firm* — Mossman, Kumar & Tyler, PC

(57) ABSTRACT

Disclosed is a method for introducing additives into formation fluid from an oil and gas well in or moving through equipment and systems located downstream from the oil and gas well. The method is practiced using pellets having a density sufficient to suspend the pellet at an interface of two phases of fluid within the Downstream Equipment. The pellets are prepared from a pellet matrix, such as an ethoxylated wax, and, optionally, a weighting agent as well as an additive. By varying the amount of weighting agent, the density of the pellet can be varied to suspend it at a desired point for a time sufficient to deliver the additive to the desired point within the Downstream Equipment. The method of the invention may also be used with Refinery Equipment such as a fuel distribution system or a waste water treatment system.

19 Claims, 1 Drawing Sheet

U.S. PATENT DOCUMENTS

| | | | |
|---|---|---|---|
| 4,905,762 A | 3/1990 | Zilch | 166/310 |
| 4,986,354 A | 1/1991 | Cantu et al. | 166/279 |
| 5,027,901 A | 7/1991 | French et al. | 166/310 |
| 5,753,596 A | 5/1998 | Martin et al. | 507/237 |
| 5,922,652 A | 7/1999 | Kowalski et al. | 507/129 |
| 6,126,872 A | 10/2000 | Kommareddi et al. | 264/4.1 |
| 6,160,036 A | 12/2000 | Kommareddi et al. | 523/175 |
| 6,270,653 B1 | 8/2001 | Gochin et al. | 208/44 |
| 6,326,335 B1 | 12/2001 | Kowalski et al. | 507/241 |
| 6,379,612 B1 | 4/2002 | Reizer et al. | 422/7 |
| 6,380,136 B1 | 4/2002 | Bates et al. | 507/90 |
| 7,135,440 B2 * | 11/2006 | Campbell | 507/269 |
| 7,196,040 B2 * | 3/2007 | Heath et al. | 507/219 |
| 2004/0043906 A1 | 3/2004 | Heath et al. | 507/200 |

FOREIGN PATENT DOCUMENTS

| | | |
|---|---|---|
| WO | WO01/94744 A1 | 12/2001 |

* cited by examiner

METHOD FOR CONTROLLED PLACEMENT OF CHEMICALS AND COMPOSITION USEFUL FOR PRACTICING SAME

RELATED APPLICATIONS

This application is a continuation-in-part of U.S. patent application Ser. No. 10/642,901, now U.S. Pat. No. 7,135,440, which claims priority from U.S. Provisional Patent Application Ser. No. 60/404,733 filed Aug. 20, 2002.

BACKGROUND OF THE INVENTION

1. Field of the Invention

This invention relates to a method for treating Downstream systems and equipment, used in the transportation and storage of formation fluids produced from oil and gas wells with chemicals useful for reducing corrosion, scale, asphaltenes and other undesirable conditions. This invention particularly relates to a method for the controlled placement and release of such chemicals.

2. Background of the Art

Fluids produced from oil wells primarily include crude oil and water and is herein referred to as formation fluid. A formation fluid may also contain natural gas which may or may not be desirable and may be the primary product of a given well in which case the well is sometimes referred to as a gas well. A formation fluid may also contain $CO_2$ and will often contain oil and water insoluble compounds such as clay, silica, waxes, and asphaltenes, which exist as colloidal suspensions. In addition to the already listed components, formation fluids can include inorganic components that can precipitate to form mineral scales.

It is known in the art of oil and gas production to eliminate or mitigate the effects these undesirable materials. For example, during oil and gas production in production wells, the drilling of new wells, or workovers of existing wells, many chemicals, referred herein as "additives", which include scale inhibitors, paraffin inhibitors, corrosion inhibitors and the like, are often injected from a surface source into the wells to treat the formation fluids flowing through such wells to prevent or control the precipitation of mineral scale, paraffins, and to protect the well against corrosion.

In addition to oil wells, there are other systems and equipment used for oil and gas exploration and production that may come into contact with formation fluids. For example, some equipment may be used to separate, at least partially, an aqueous phase from a hydrocarbon phase. Other equipment may be used to eliminate excess water from a gas phase of a formation fluid. The formation fluid is often transported to a refinery or other location where it is refined or otherwise treated in order to prepare it for marketing. Any or all of these systems may be exposed directly to formation fluid, and as a result be subject to the same problems as described for oil and gas wells.

Supplying additives in the form of emulsions and solutions can also be an expense. Solutions and emulsions are, by their natures, composed of mostly inactive materials: water and/or solvents. It would be desirable in the art of treating systems and equipment used to produce oil and gas to supply additives in a form that is economical to ship and handle and does not require co-shipping inactive components.

While using solid additives would seem to be a good means of avoiding the problems associated with additive solutions and emulsions, it too is not without problems. One such problem is metering solids. The metering of solids may be both expensive and prone to blockages and other conditions requiring maintenance. One solution to this problem is disclosed in U.S. Pat. No. 6,326,335 B1, to Kowlaski, et al. Therein it is disclosed to prepare a microencapsulated additive wherein the additive is incorporated into a gelatin capsule, weighted with a heavy metal compound.

It would be desirable in the art of treating systems and equipment used in the exploration for and production of oil and gas with additives, to use solid additives that would release slowly with time. It would be particularly desirable to use solid additives that would not require heavy metals as weighting agents. It would also be particularly desirable in the art to locate the additives at the point that requires the treatment for which the additives are used.

SUMMARY OF THE INVENTION

In one aspect, the invention is a method for treating Downstream Equipment with chemicals wherein the Downstream Equipment contains a multiphase formation fluid having at least a first fluid phase and a second fluid phase of differing densities, the method comprising: introducing the chemicals into the multiphase formation fluid in the form of pellets, at a point that is either: upstream from the Downstream Equipment, or within the Downstream Equipment; and wherein: the first fluid phase is the most dense fluid phase in the multiphase formation fluid; the second fluid phase is the phase into which it would be desirable to introduce the chemicals; and the pellets have a density that is less than that of the first fluid phase and greater than or about the same as the second fluid phase.

In another aspect, the invention is a method for treating Refinery Equipment with chemicals wherein the Refinery Equipment contains a multiphase fluid having at least a first fluid phase and a second fluid phase of differing densities, the method comprising: introducing the chemicals into the multiphase fluid in the form of pellets, at a point that is either: upstream from the Refinery Equipment, or within the Refinery Equipment; and wherein: the first fluid phase is the most dense fluid phase in the multiphase fluid; the second fluid phase is the phase into which it would be desirable to introduce the chemicals; and the pellets have a density that is less than that of the first fluid phase and greater than or about the same as the second fluid phase

BRIEF DESCRIPTION OF THE DRAWINGS

For a detailed understanding and better appreciation of the present invention, reference should be made to the following detailed description of the invention and the preferred embodiments, taken in conjunction with the accompanying figures.

DETAILED DESCRIPTION OF THE PREFERRED EMBODIMENT

Figure 1:
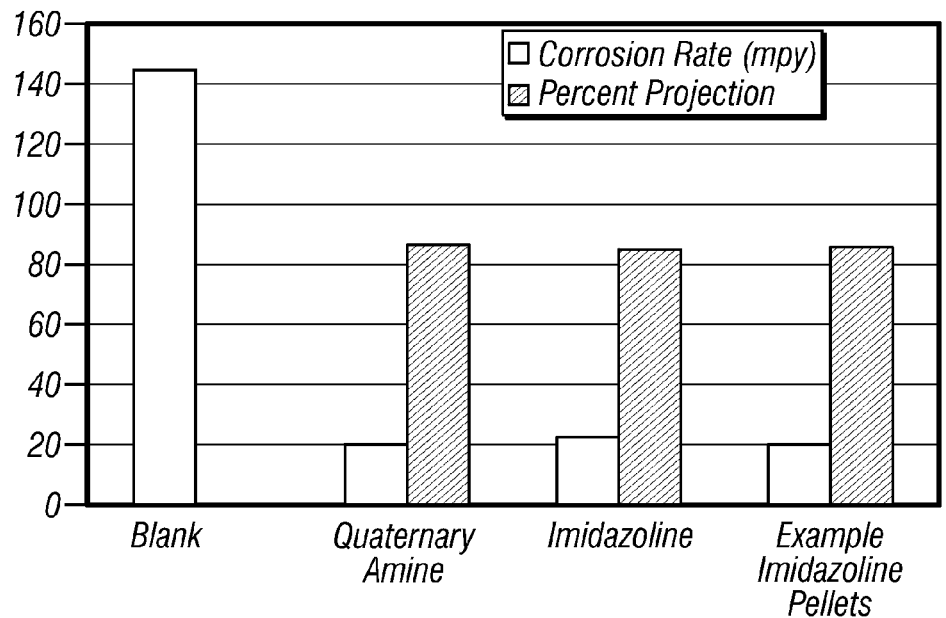
FIGS. 1 and 2 are graphical representations of data from Example 1.

After formation fluid is withdrawn or removed from an oil well, it is typically sent to a refinery for conversion into hydrocarbon products such as motor fuels, lubricants, and chemical feed stocks. The route by which the formation fluid gets to the refinery and how it is handled during the process can vary dramatically depending upon the logistics of where the oil is produced, the location of the refinery to which is going to be sent, and the economic considerations of moving the formation fluid from the well to the refinery. For the purposes of the present invention, the term "Downstream Equipment" refers to any vessel, apparatus, or system that comes into contact with formation fluid during the transportation or storage of the formation fluid prior to its being refined. Exemplary Downstream Equipment includes, but is not limited to: undersea flow lines, pipelines, storage vessels, storage tanks, railroad tank cars, tank trucks, storage holds on ships, holding tanks, oil dehydrators, oil desalters, oil/water/gas-separators, water filters, gas heaters, gas dehydrators, oil/water/gas separators, gas dehydrators, and gas sweeteners.

The method of the invention can be practiced at any point during the transportation and/or storage of formation fluid wherein the formation fluid is a multiphase fluid having at least two phases with one phase being denser than at least one other phase and it is desirable to introduce chemicals into the less dense phase. For example, after the formation fluid reaches a refinery, it may be held prior to being processed and the vessel wherein it is stored would be Downstream Equipment for purposes of the present invention.

The invention may also be used in other applications where there is a fluid having at least two phases. For example, operations within a refinery where formation fluid is refined into hydrocarbons and the refined hydrocarbons exist as a multiphase fluid or where the hydrocarbons are admixed with water may be a venue suitable for the present invention. Any operations that have equipment where hydrocarbons exist as a multiphase fluid or where the hydrocarbons are admixed with water may be a venue suitable for the present invention. Such equipment, whether associated with a refinery or not, is, for the purposes of the present invention, defined as Refinery Equipment. Expressly included in the term Refinery Equipment are vessels and distribution systems used to transport refined hydrocarbons such as a storage tank at a fuel distribution center. Still another installation expressly included in the term Refinery Equipment is a gasoline or diesel fuel storage tank at a retail location.

Another application where the present invention may be useful is a waste water treatment system where hydrocarbons are collected along with water. Such systems may contain equipment to concentrate hydrocarbons prior to their removal from water such as an API Separator or a Gas Flotation Cell. A TRIDAIR HYDRAULIC Induced Gas Flotation System is an example of such a system and the present invention may be practiced with such a system.

The method of the present invention, whether practiced in Downstream Equipment, or Refinery Equipment, may be practiced in the same way and the following teachings are applicable to all applications.

In some embodiments of the invention, it may be desirable to place additives into Downstream Equipment at different locations within the equipment. For example, in one embodiment of the present invention, a pellet including a corrosion inhibitor is used to treat a storage tank to protect the tank from corrosion. While corrosion can occur where the tank is in contact with a light phase fluid consisting primarily of hydrocarbons, corrosion usually will occur more rapidly where the tank is in contact with a heavier phase having a higher water content. In such an instance, it may be desirable to prepare pellets having a density greater than that of the lighter phase but less than that of the heavier phase. Such a pellet, once introduced into the tank, would tend to remain at the interface of the two phases and could thereby release its additives into both the heavier and lighter phases of the fluid column. This would be particularly useful in applications where the two phases are relatively static such as in a long term storage tank.

The choice of where to place an additive may vary from application to application. The parameters which could influence a decision as to where to place the pellets useful with the present invention include, but are not limited to: location of the interface of the fluid phases, the rate that fluid is passing through the equipment, the degree to which the phases are intermixed, and the chemical properties of the individual phases as well as the formation fluid as whole. Preferably, the densities of the phases within the fluid would be known or determined using conventional testing and modeling methods well known to those of ordinary skill in the art of handling formation fluids to be useful.

Once the density of the fluid phases is known, and a decision is made as to where to place the chemical, then an appropriate density for the pellet to carry the chemical may be selected. To place the pellet within a phase, the pellet should have the about the same density as the phase. To place the pellet between phases, the density of the pellet should be as close to the average density of the two phases as possible. The pellet is then prepared by admixing at least one additive, the pellet matrix, and sufficient weighting material to produce a pellet having the desired density. In the practice of the method of the present invention, the pellets useful with that method preferably have a density of from about 0.6 to about 1.3, more preferably have a density of from about 0.8 to about 1.2, and most preferably have a density of from about 0.9 to about 1.1.

In the method of the present invention, a pellet is used to introduce additives at a selected point within a formation fluid. The additive may be delivered to the selected location by adjusting the density of a pellet containing the additive using a weighting agent. The weighting agent can be any material having a density different than the active additive and that can be dispersed within a pellet useful with the present invention. A weighting agent may increase or decrease the effective density of the pellet. The weighting agent is preferably selected from the group consisting of inorganic salts that are sparingly soluble in formation fluids such as calcium sulphate, magnesium sulphate, calcium carbonate, titanium oxide, aluminum oxide, potassium chloride, sodium chloride, and mixtures thereof.

The additives of the present invention are introduced into Downstream Equipment using pellets. The pellets have a pellet matrix and dispersed within the matrix is the weighting agent and additive. In some embodiments, the additive preferably exists as tiny but discrete inclusions within the pellet. In other embodiments, the additive is completely dispersed. The pellets useful with the method of the present invention can be formed by any process known to those of ordinary skill in the art to be useful. For example, in one embodiment, the pellets are prepared in a pellet mill by forcing an admixture of additive, weighting agent and pellet matrix through a die under pressure pursuant to known processes using known machines. The pellets preferably have a major cross-sectional dimension that is greater than 0.05 mm but less than 3 mm. The pellets may be cut to particular desired lengths as extruded, but may also be allowed to break randomly to provide a pelletized product averaging between 0.2 mm and 3 mm in length.

In another embodiment, the pellets useful with the present invention are formed using a prilling process. In a prilling process, the admixture of weighting agent, additive and pellet matrix are spayed into a refrigerated cylinder and allowed to coalesce and form a pellet while in free-fall. Other means of preparing the pellets useful with the present invention include crystallization, precipitation, pan-coating, fluid-bed coating, fluid bed agglomeration, rotary atomization, extrusion, spheronization, drum granulation and high shear agglomeration, but any method capable of producing the pellets having utility with the method of the present invention can be used.

Additives useful with the method of the present invention include those used to prevent or mitigate formation of scale, paraffins, asphaltenes, and emulsions. Other additives useful for preventing or mitigating the occurrence of corrosion, bacteria growth, and foaming can also be used with the method of the present invention. For example, when bacteria growth is an issue, the additive and can be a bactericide selected from the group consisting of formaldehyde, paraformaldehyde, glutaraldehyde, ammonia, quaternary ammonium compounds, sodium hypochlorite, phenols, and mixtures thereof. Any bactericide known to those of ordinary skill in the art to be useful can be used with the method of the present invention.

When the additives used with the method of the present invention are corrosion inhibitors, they preferably are selected from the group consisting of carboxylic acids and derivatives such as aliphatic fatty acid derivatives, imidazolines and derivatives; including amides, quaternary ammonium salts, rosin derivatives, amines, pyridine compounds, trithione compounds, heterocyclic sulfur compounds, quinoline compounds, or salts, quats, or polymers of any of these, and mixtures thereof. For example, suitable inhibitors include primary, secondary, and tertiary monoamines; diamines; amides; polyethoxylated amines, diamines or amides; salts of such materials; and amphoteric compounds. Still other examples include imidazolines having both straight and branched alkyl chains, phosphate esters, and sulfur containing compounds.

Another additive useful with the present invention is a paraffin inhibitor. Dispersants that act as solubilizing agents for paraffin, e.g., nonionic and anionic surfactants can also be used with the present invention. Paraffin inhibitors can also be long chain polymers and/or surface-active materials. Any paraffin inhibitor useful known to be useful to those of ordinary skill in the art can be used with the present invention.

Still another additive that can be used with the method of the present invention is an asphaltene inhibitor. Suitable asphaltene treatment chemicals include those such as alkylphenol ethoxylates and aliphatic polyethers.

Another additive that can be used with the present invention includes the scale inhibitors. Scale Inhibitors that can be used with the method of the present invention include phosphate esters, polyacrylates, phosphonates, polyacrylamides, and polysulfonated polycarboxylates.

The pellets useful with the present invention are prepared using a pellet matrix. The pellet matrix is the continuous phase within which the additive and weighting agent are dispersed. A pellet matrix useful with the present invention functions to slowly release the additive. With time, desirably, the pellet will shed sufficient additive and/or weighting agent to decrease in density to rise to the top of the fluid column. Most preferably the pellet matrix is one that will slowly dissolve in the fluid to avoid a build up of pellets during extended periods of treatment with pellets.

Pellet matrices useful with the present invention are any which have the qualities set forth immediately above. Preferred pellet matrices useful with the present invention include, but are not limited to: linear alcohols, waxes, ethoxylates, sugars, ureas, starches, and mixtures thereof. Most preferably, the pellet matrices used to prepare the pellets useful with the method of the present invention are waxes and ethoxylated waxes.

In addition to the embodiments already described, the present invention also includes certain additional embodiments. For example, in one embodiment, the present invention is a pellet useful for delivering at least one additive to two locations within a formation fluid. In this embodiment, a first pellet is prepared which has a relatively low density. This pellet is then coated with a second layer of pellet matrix, additive and weighting agent having a higher density. In this embodiment, the pellet could be used to first treat a denser fluid phase, then shed the outer layer and treat a less dense fluid phase. Other embodiments are also possible, including one where there are two separate additives, the first being a relatively dense additive which is quickly released and second additive which is released more slowly, the pellet losing density as the first, heavier additive is released.

In addition to the embodiments already described, the present invention also includes admixtures of pellets. For example, one pellet may contain a corrosion inhibiting additive and have a density suitable to be delivered between the light hydrocarbon based and the heavier water based phase. A second pellet may contain a foaming agent for the removal of water to be delivered into the heavier water based phase. The treatment for Downstream Equipment well may consist of a mixture of the two pellets delivered at one time. Any number or combination of different pellets may be delivered in one application according to the method of the present invention.

The inhibitors of the present invention are desirably slow release inhibitors. In the practice of the method of the present invention, preferably the rate of release of the inhibitors from the pellets is controlled by varying the size of the inclusions, or droplets, of the additives within the pellets or by varying the size of the pellets themselves. In another embodiment varying the chemical composition of the pellet matrix controls the rate of release. While not wishing to be bound by any theory, it is believed that the release rate is a function of droplet size and or pellet size. The larger the droplet or pellet size, the smaller the surface area relative to the droplet or pellet volume. In two pellets having the same additive loading, the pellets with larger droplets will release their additive more slowly than the pellets with smaller droplets. Preferably, by controlling the shear rate when the pellet matrix and additive is admixed, the rate of release is controlled to be from about one month to one year, more preferably from about two months to about ten months, and most preferably from about two months to about six months.

The rate of release of additives from the pellets useful with the present invention can vary according to the type of additive and pellet matrix selected to prepare the pellets. Preferably, the pellets of the present invention will be used to release additive at a rate of from about 5 to about 500 parts per million of formation fluid with the value being the concentration required to obtain the desired result and performance from the chemical additive. The pellets will release at a fixed rate based upon the size of the pellet or droplet size of the additive within the pellet, so the dosage for a given well can be adjusted according to the production rate for the subject oil and gas well.

The method of the present invention is practiced by introducing additives to the fluid in Downstream Equipment in the form of a pellet. The pellets are preferably suspended in a liquid and introduced directly into the equipment or, in the case of Downstream Equipment that is experiencing a flow of formation fluid into or through the equipment, the pellets may be introduced into the formation fluid upstream from the Downstream Equipment and carried into the Downstream Equipment. For example, since formation fluids also traverse pipelines, the pellets may be applied into a pipeline system to achieve the beneficial results from chemical additives and then carried into other Downstream Equipment. The pellets may be introduced suspended in a liquid, washed or dropped into the pipe system, or placed in a restraining device such as a basket or cloth holder and then released.

EXAMPLES

The following examples are provided to illustrate the present invention. The examples are not intended to limit the scope of the present invention and they should not be so interpreted. Amounts are in weight parts or weight percentages unless otherwise indicated.

Example 1

A pellet useful with the method of the present invention is prepared by admixing at a high shear rate imidazoline corrosion inhibitor (20 weight percent Baker Petrolite CRO111), calcium carbonate, and a polyethylene wax. The admixture is prepared and then pelletized by prilling. The pellets have a mean diameter of less than 1000 microns. The pellets have an average density of 1.0 specific gravity unit (sgu).

Standard sparged beaker and kettle tests are run for 1 to 5 days, to determine if the pellets inhibited corrosion when compared to standard inhibitors. The results are presented in FIG. 1.

Figure 2:
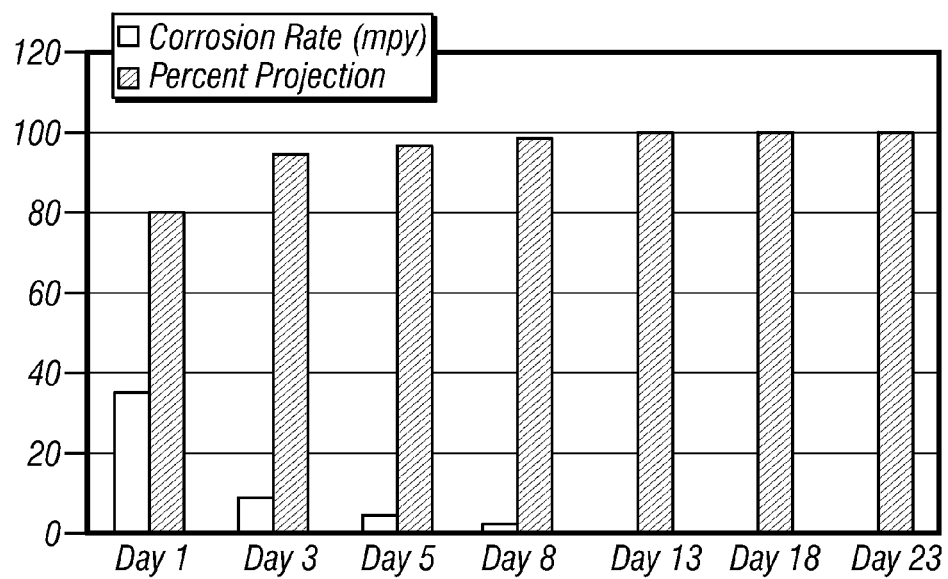

In long term testing, kettle test cells are prepared identically but coupons were inserted at spaced time intervals with linear polarization resistance (LPR) measurements and weight loss being measured over 24 hours. The results are presented in FIG. 2.

A series of bottles with 100 percent Isopar M®, 100 percent brine, or 80/20 brine/oil are prepared with 0.175 grams of pellets. The bottles are kept at 180° F. (82.2° C.) for a set period of time. At the given time, a single bottle is removed and the remaining pellets captured by filtration and dried to a constant weight. A total of 84 bottles are prepared for a test to run two months. The release rate for each bottle is determined by mass difference. Based upon this static data, the pellets provide a constant release rate for 1.5 to 2 months. The data is displayed below in Table 1.

Flow through beaker testing at 120° F. (48.9° C.) using three kettles in series was run for 4 days to compare corrosion inhibition performance between CRO111 within a pellet and conventional CRO111. The flow rate was such that the entire fluid was replaced 9 times per day. Chemical residuals were run to confirm the concentration of inhibitor. Based upon the measured inhibitor residual, the pellet product under the flow through beaker test should provide a constant inhibitor rate for between 1.1 and 1.6 months.

TABLE 1

| Time (days) | Brine | | 80/20 Brine/Isopar M | | Isopar M | |
|---|---|---|---|---|---|---|
| | Mass Loss | Rate (%/hr) | Mass Loss | Rate (%/hr) | Mass Loss | Rate (%/hr) |
| 1 | 0.004 | 0.0868 | 0.008 | 0.1736 | 0.011 | 0.2387 |
| 3 | 0.005 | 0.0362 | 0.011 | 0.0796 | 0.038 | 0.2749 |
| 10 | 0.011 | 0.0239 | 0.032 | 0.0694 | 0.127 | 0.2756 |
| 17 | 0.014 | 0.0179 | 0.049 | 0.0626 | 0.169 | 0.2157 |
| 24 | 0.021 | 0.0190 | 0.073 | 0.0660 | 0.181 | 0.1637 |
| 31 | 0.024 | 0.0168 | 0.098 | 0.0686 | 0.183 | 0.1281 |
| 38 | 0.031 | 0.0177 | 0.121 | 0.0691 | 0.191 | 0.1091 |
| 45 | 0.033 | 0.0159 | 0.142 | 0.0685 | 0.187 | 0.0902 |
| 52 | 0.037 | 0.0154 | 0.164 | 0.0684 | 0.189 | 0.0789 |
| 59 | 0.039 | 0.0143 | 0.204 | 0.0750 | 0.188 | 0.0692 |

What is claimed is:

1. A method for treating Downstream Equipment with chemicals wherein the Downstream Equipment contains a multiphase formation fluid having at least a first fluid phase and a second fluid phase of differing densities, the method comprising:
    introducing the chemicals into the multiphase formation fluid in the form of pellets, at a point that is either:
        upstream from the Downstream Equipment wherein the pellets are carried into the Downstream Equipment by the flow of the multiphase formation fluid, or
        within the Downstream Equipment; and
    wherein:
        the first fluid phase is the most dense fluid phase in the multiphase formation fluid;
        the second fluid phase is the phase into which it would be desirable to introduce the chemicals; and
        the pellets have a density that is less than that of the first fluid phase and greater than or about the same as the second fluid phase.

2. The method of claim 1 wherein there are only two fluid phases.

3. The method of claim 1 wherein the pellets have a density such that they stay at or near an interface between the first and the second fluid phases.

4. The method of claim 1 wherein the pellets have a density of from about 0.6 to about 1.3.

5. The method of claim 4 wherein the pellets have a density of from about 0.8 to about 1.2.

6. The method of claim 5 wherein the pellets have a density of from about 0.9 to about 1.1.

7. The method of claim 1 wherein the pellets are prepared with a weighting agent selected from the group consisting of calcium sulphate, magnesium sulphate, calcium carbonate, titanium oxide, aluminum oxide, potassium chloride, sodium chloride, and mixtures thereof.

8. The method of claim 1 wherein the pellets have a major cross-sectional dimension that is greater than 0.05 mm but less than 3 mm.

9. The method of claim 1 wherein the chemicals are additives.

10. The method of claim 9 wherein the additive is used to prevent or mitigate the formation of scale, paraffins, asphaltenes emulsions, and combination thereof.

11. The method of claim 9 wherein the additive is used to prevent or mitigate the occurrence of corrosion, bacteria growth, foaming, and combinations thereof.

12. The method of claim 9 wherein the pellets have two different additives in the same pellet.

13. The method of claim 9 wherein the pellets are a mixture of pellets having one additive per pellet and some of the pellets have a first additive and other pellets have a second additive.

14. The method of claim 1 wherein the pellets are introduced directly into the Downstream Equipment.

15. A method for treating refinery equipment with chemicals wherein the refinery equipment contains a multiphase fluid having at least a first fluid phase and a second fluid phase of differing densities, the method comprising:
    introducing the chemicals into the multiphase fluid in the form of pellets, at a point that is either:
        upstream from the Refinery Equipment, or
        within the Refinery Equipment; and
    wherein:
        the first fluid phase is the most dense fluid phase in the multiphase fluid;
        the second fluid phase is the phase into which it would be desirable to introduce the chemicals; and the pellets have a density that is less than that of the first fluid phase and greater than or about the same as the second fluid phase.

16. The method of claim 1 wherein there are only two fluid phases.

17. The method of claim 1 wherein the pellets have a density such that they stay at or near an interface between the first and the second fluid phases.

18. The method of claim 1 wherein the pellets have a density of from about 0.6 to about 1.3.

19. The method of claim 4 wherein the Refinery equipment is part of a fuel distribution system or a waste water treatment system.

* * * * *